(12) United States Patent
Gouge (10) Patent No.: US 6,357,169 B1
(45) Date of Patent: Mar. 19, 2002

(54) BAIT SAVER BUCKET

(76) Inventor: Jeffrey Kyle Gouge, 218 Max Jett Rd., Johnson City, TN (US) 37601

( * ) Notice: Subject to any disclaimer, the term of this patent is extended or adjusted under 35 U.S.C. 154(b) by 0 days.

(21) Appl. No.: 09/626,226

(22) Filed: Jul. 26, 2000

(51) Int. Cl.⁷ .............................................. A01K 97/05

(52) U.S. Cl. ........................... 43/56; 220/263; 220/264

(58) Field of Search ........................... 43/54.1, 55, 56; 206/315.11; 220/263, 264

(56) References Cited

U.S. PATENT DOCUMENTS

| | | | |
|---|---|---|---|
| 3,831,310 A | 8/1974 | Frangullie | |
| 3,955,306 A | 5/1976 | Handa | |
| 5,109,625 A | * 5/1992 | Skrede | ........................ 43/56 |
| 5,394,639 A | 3/1995 | Tentler | |
| 5,529,204 A | * 6/1996 | Sykes | ........................ 220/335 |
| 5,802,760 A | 9/1998 | Campbell | |

FOREIGN PATENT DOCUMENTS

DE 3204283 A1 * 8/1983

* cited by examiner

Primary Examiner—Peter M. Poon
Assistant Examiner—Floris C Copier
(74) Attorney, Agent, or Firm—Michael I. Kroll (57) ABSTRACT

A bait saver bucket with a multi-chambered container having separations for segregating different sizes of live bait as well as providing slots for segregating fishing lines having bait and hook attached thereto, especially while relocating equipment from one location to another. The multi-chambered container is comprised of an outer container for holding an amount of fluid therein and having a closure and a handle and having an inner floating container comprising removable basket-like compartments oppositely opposed and spaced apart by a cover member having apertures substantially conforming to the top openings of the basket-like compartments and having a centrally disposed aperture having a hingedly attached cover for covering the aperture and when opened providing access to the interior of the remainder of the outside bucket enclosure not occupied by the compartments. The cover has slots for allowing leaders to pass through the cover without being crimped.

20 Claims, 10 Drawing Sheets

BAIT SAVER BUCKET

BACKGROUND OF THE INVENTION

1. Field of the Invention

The present invention relates generally to fishing equipment and, more specifically, to a multi-chambered container providing means for segregating different sizes of live bait as well as providing means for segregating fishing lines having bait and hook attached thereto especially while relocating equipment from one location to another. Said multi-chambered container is comprised of an outer container for holding an amount of fluid therein and having means for closure and means for carrying and having an inner floating container comprising removable basket-like compartments oppositely opposed and spaced apart by a cover member having apertures substantially conforming to the top openings of the basket-like compartments and having a centrally disposed aperture having a hingedly attached cover providing closure means for said aperture and when opened providing access to the interior of the remainder of the outside bucket enclosure not occupied by the two basket-like compartments.

2. Description of the Prior Art

There are other bait buckets designed to prolong the usefulness of the bait. Typical of these is U.S. Pat. No. 3,831,310 issued to Frangullie on Aug. 27, 1974.

Another patent was issued to Tentler on Mar. 7, 1995 as U.S. Pat. No. 5,394,639. Yet another U.S. Pat. No. 5,802,760 was issued to Campbell on Sep. 8, 1998 and still yet another was issued on May 11, 1976 to Handa as U.S. Pat. No. 3,955,306.

U.S. Pat. No. 3,831,310

Inventor: George C. Franguillie

Issued: Aug. 27, 1974

To keep live bait from clustering together and thus shortening their lives, the bait bucket is divided into a number of bait storage compartments by means of spacers or partitions. The spacers preferably are perforated with a number of fluid flow passages which are large enough to permit the flow of water, but are too small to permit the bait itself from passing between compartments. In addition, the bucket preferably includes a thermal compartment to provide some control over the temperature of the water in which the live bait is carried, a compartment that may be filled with ice in hot weather when the ambient temperature is low. An optional feature is an air stone or aerator in the bottom of the bait compartments, together with appropriate air tubing or passageways adapted for connection to a source of air.

U.S. Pat. No. 5,394,639

Inventor: Lynn A Tentler

Issued Mar. 7, 1995

A live bait storage system for keeping bait for long periods of time without maintenance includes a portable trolling bait container which has one side hydrodynamically contoured to permit the container to be readily trolled through the water in a predictable and controlled course. The portable bait container is adapted for use in conjunction with a long-term bait keeping station which is uniquely designed to permit bait to be transferred between the station and the container without manual handling and without injuring the fragile bait species. A rimless pour spout is provided for this purpose. The bait station is adapted to be suspended in a pre-selected support zone in a body of water for providing the bait species with proper temperature conditions and aeration and for supplying natural food supplies to the bait while stored.

U.S. Pat. No. 5,802,760

Inventor: Jason E. Campbell

Issued: Sep. 8, 1998

A light weight plastic storage container having joined framed storage section rings detachably attached to a lower live bait well. Each ring has frame openings for several latched drawers one of which has a self contained power source to aerate the bait well. An insulated beverage holder may be inserted into a formed cylindrical common center hole in the section rings. The container☐s top cushion can be used as a seat and has a carrying handle. Both the plastic injection molding process and the blow molding process can be used to manufacture the plastic component parts.

U.S. Pat. No. 3,955,306

Inventor: Handa

Issued: May 11, 1976

A live bait bucket of customary double-container arrangement. The inner container is provided with a vertically movable scoop and a hinged lid for closing the access opening in the container. The lid is formed with an elongated slot and a pull rod connected to the scoop projects up through the slot. Abutment means are mounted on the pull rod and slidably engage the underside of the lid so that lifting of the pull rod simultaneously opens the lid. Spring means are provided for automatically closing, and retaining closed, the lid when the pull rod is released.

While these bait buckets may be suitable for the purposes for which they were designed, they would not be as suitable for the purposes of the present invention, as hereinafter described.

SUMMARY OF THE PRESENT INVENTION

A primary object of the present invention is to provide a bait bucket having a plurality of segregated compartments therein;

Another object of the present invention is to provide a bait bucket having an outer container and having an inner container having a plurality of apertures circumferentially located providing fluid communication means between the inner and outer container;

Yet another object of the present invention is to provide a bait bucket having an inner container having a plurality of apertures circumferentially located providing fluid communication means between the inner and outer container and having means for floating within said outer container;

Still yet another object of the present invention is to provide a bait bucket having an inner floating container having a plurality of segregated compartments therein;

Yet another object of the present invention is to provide a number of segregated compartment having a wall structure wherein fluid communication between all containers within said outer container is performed freely.

Yet another object of the present invention is to provide a cover with slots positioned such that bait on a hook and leader can be secured in one of a number of segregated compartments, and the cover attached, without crimping the leader.

Additional objects of the present invention will appear as the description proceeds.

The present invention overcomes the shortcomings of the prior art by providing a multi-chambered container having means for segregating different sizes of live bait as well as providing means for segregating fishing lines having bait and hook attached thereto especially while relocating equipment from one location to another. Said multi-chambered container is comprised of an outer container for holding an amount of fluid therein and having means for closure and means for carrying and having an inner floating container comprising removable basket-like compartments oppositely opposed and spaced apart by a cover member having apertures substantially conforming to the top openings of the basket-like compartments and having a centrally disposed aperture having a hingedly attached cover providing closure means for said aperture and when opened providing access to the interior of the remainder of the outside bucket enclosure not occupied by the two basket-like compartments. The cover has slots for allowing leaders to pass through the cover without being crimped.

The foregoing and other objects and advantages will appear from the description to follow. In the description reference is made to the accompanying drawings, which form a part hereof and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which:

FIG. 3 is an exploded view of the present invention. Shown is an outer container for holding an amount of fluid therein and having a handle for carrying. Also shown is an inner container having a handle for carrying and having a hingedly attached cover providing closure means for said container and when hingedly opened providing access to said inner container. Further having a plurality of apertures located circumferentially around said inner container providing fluid connection means between the inner and outer container. Said inner container having a cover wherein are positioned two removable basket-like compartments oppositely opposed and spaced apart by the cover member. Said cover member having apertures substantially conforming to the top openings of the basket-like compartments and having a centrally disposed aperture providing access to the interior of the remainder of the outside bucket enclosure not occupied by the two basket-like compartments;

DESCRIPTION OF THE REFERENCE NUMERALS

Turning now descriptively to the drawings, in which similar reference characters denote similar elements throughout the several views, the Figures illustrate the woodworking station of the present invention. With regard to the reference numerals used, the following numbering is used throughout the various drawing figures.

10 bait saver bucket
12 fish or large bait
14 bait
16 bait
30 outer container
32 outer container handle
40 inner container
42 inner container handle
44 inner container holes
46 inner container wall portion
48 inner container bottom
50 inner container bottom holes
50 inner container top portion
61 center aperture
62 compartment
64 compartment
66 top portion aperture
68 top portion aperture
70 compartment holes
72 top portion cutaway
74 top portion cutaway
76 handle connector
78 handle connector
80 top portion slot
82 top portion pivot attachment
90 cover
92 hook
94 tongue
96 cover holes
98 cover slot
100 cover slot
102 fishing line

DETAILED DESCRIPTION OF THE PREFERRED EMBODIMENT

Turning now descriptively to the drawings, in which similar reference characters denote similar elements throughout the several views, FIGS. 1–10 illustrate the bait saver bucket of the present invention indicated generally by the numeral 10.

Figure 1:
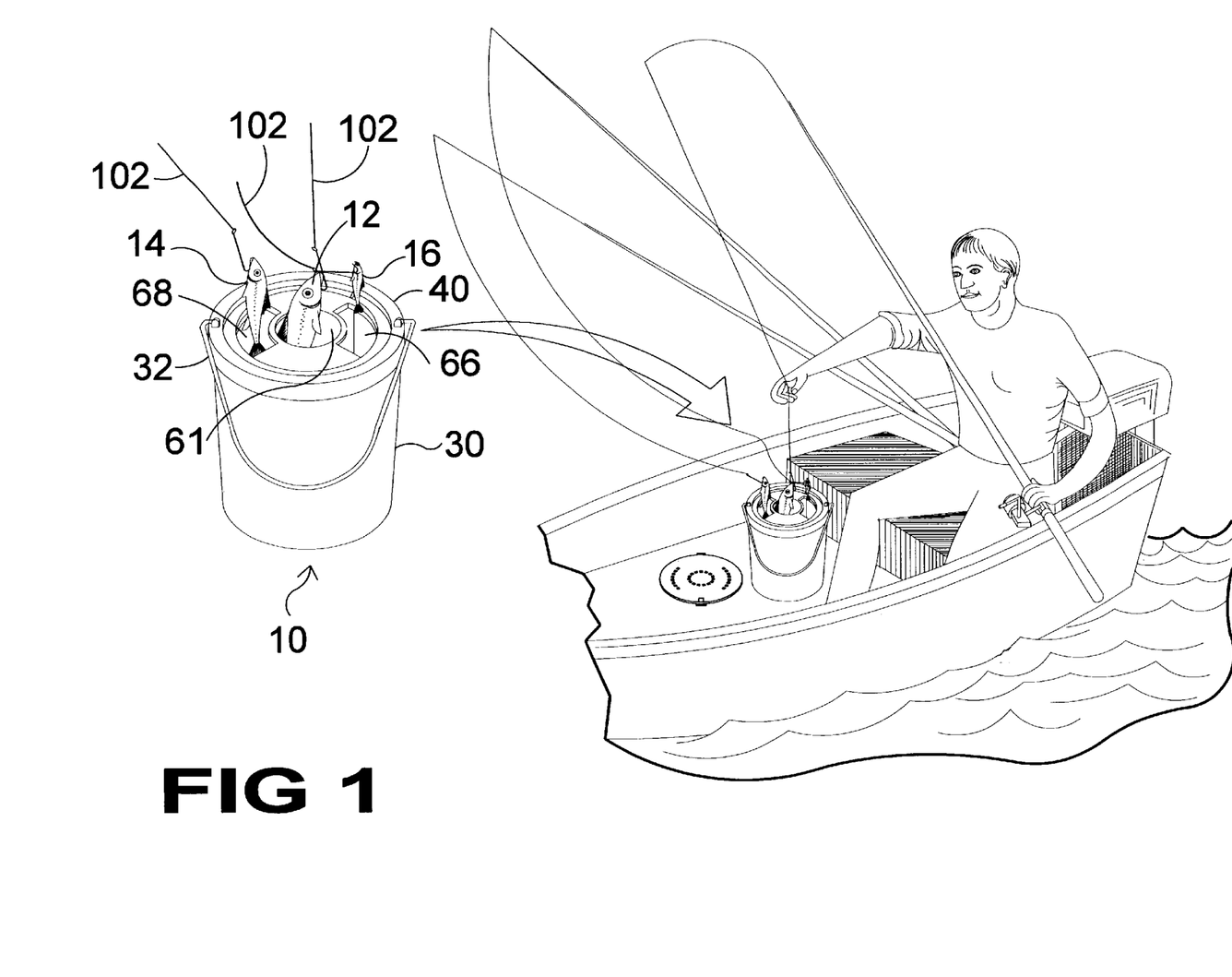
FIG. 1 is a perspective view of the present invention in use. Shown is a fisherman having a number of fishing poles each having a different type bait attached thereto which have been insert and submerged into segregated compartments within a single bait bucket.
Figure 2:
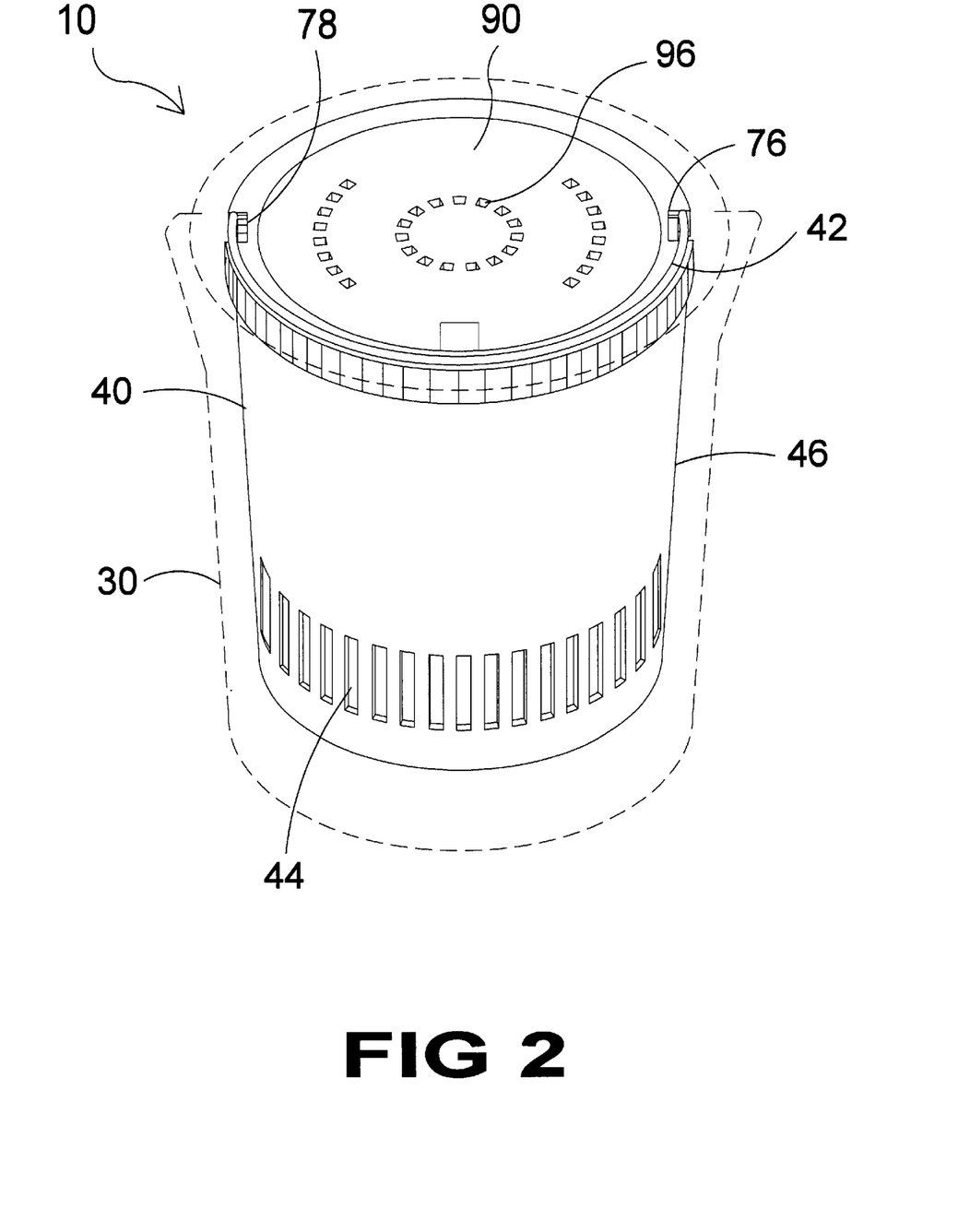
FIG. 2 is perspective view of the present invention. Shown is an outer container, shown in outline, for holding an amount of fluid therein, and means for carrying, and also having an inner multi-chambered floating container having means for closure and comprising removable basket-like compartments oppositely opposed and spaced apart by a cover member having apertures substantially conforming to the top openings of the basket-like compartments and having a centrally disposed aperture which provides access to the interior of the remainder of the outside bucket enclosure not occupied by the two basket-like compartments.
Figure 3:
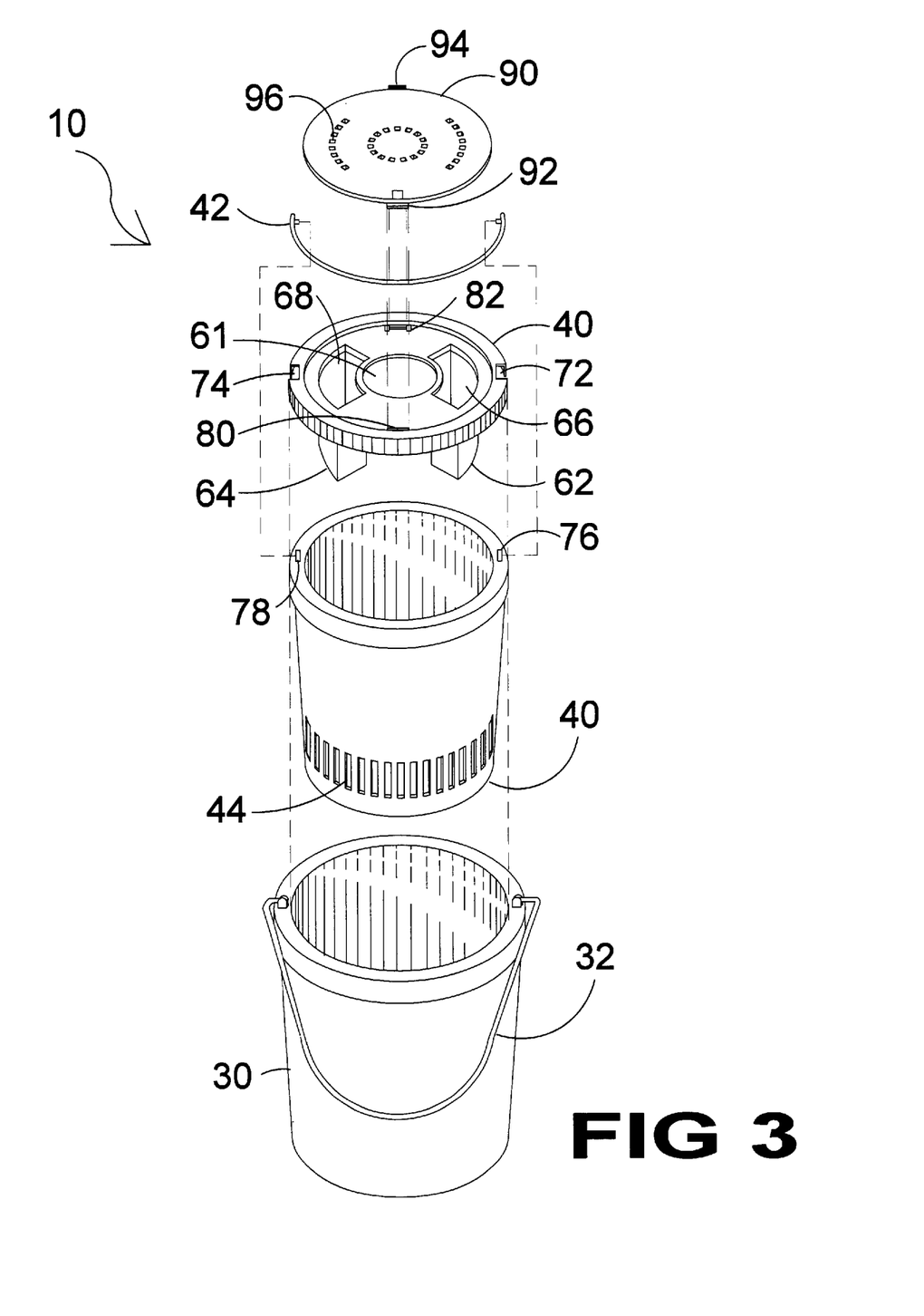
Figure 4:
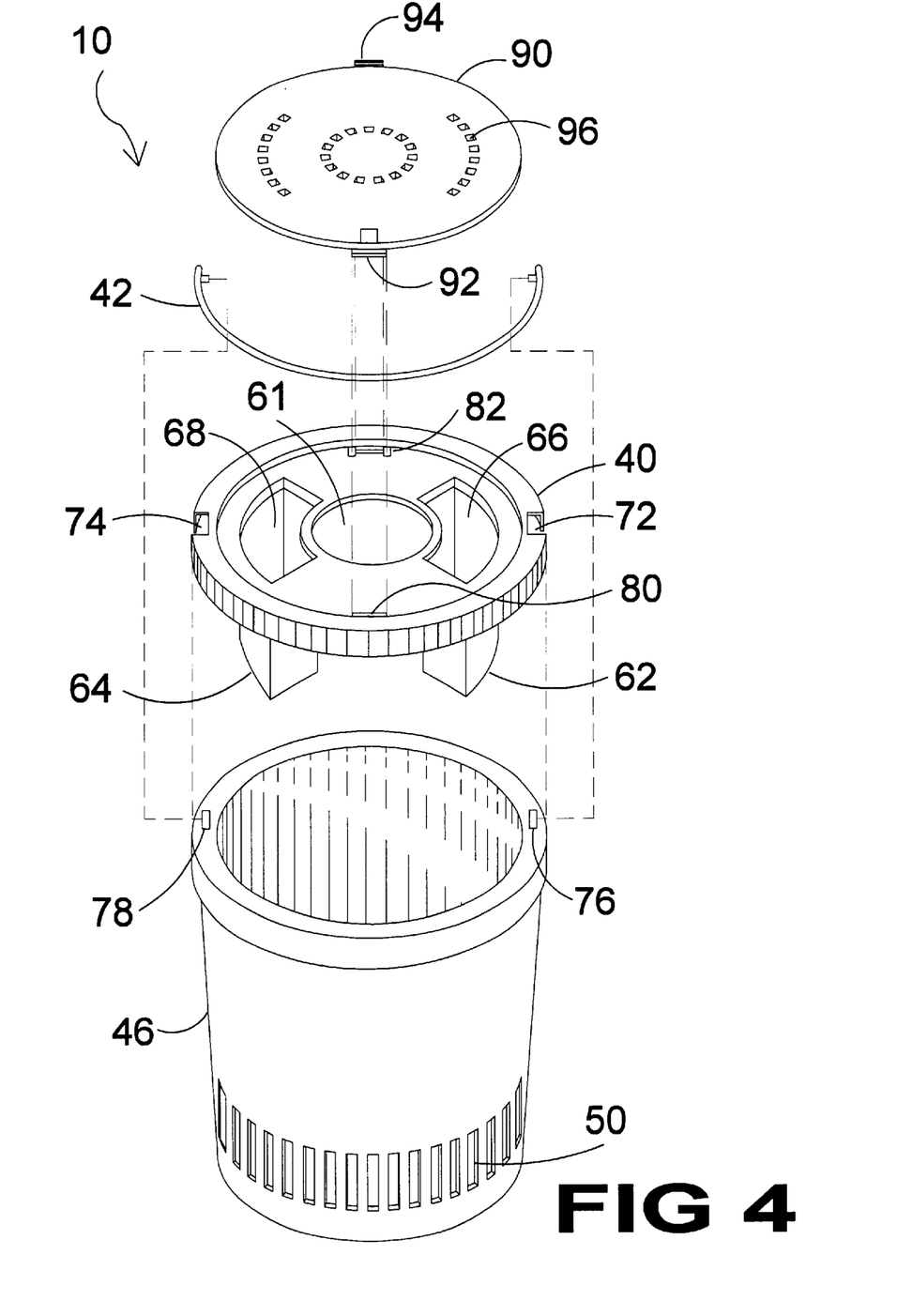
FIG. 4 is an enlarged exploded view of the inner floating container. Shown is the inner container having a handle for carrying and a plurality of aperture located circumferentially around said container providing fluid connection means between the inner and outer container. Also shown is a hingedly attached cover member, which when opened provides access to basket-like compartments. The cover also has a centrally disposed aperture providing access to the interior of the remainder of the enclosure formed by said inner container not being occupied by the two basket-like compartments.

The bait saver bucket 10 is shown generally in FIGS. 1–10, while FIG. 1 depicts the bait saver bucket 10 in use. The compartmentalization of various contents 12,14,16 are there shown. The bait saver bucket 10 has an outer container 30 with handle 32, which is watertight. As shown in FIG.3, the outer container 30 closely receives an inner container 40, which also has a handle 42. Both handles 32,42 are hingedly connected. Fluid passage holes 44 are provided on the inner container 40, which allow fluid communication through the wall portion 46 of the inner container 40. The inner container 40 is open bottomed in the embodiment depicted in FIG. 7. In another embodiment, depicted in FIG. 9 the inner container 40 has a bottom 48, which has fluid passage holes 50.

Figure 5:
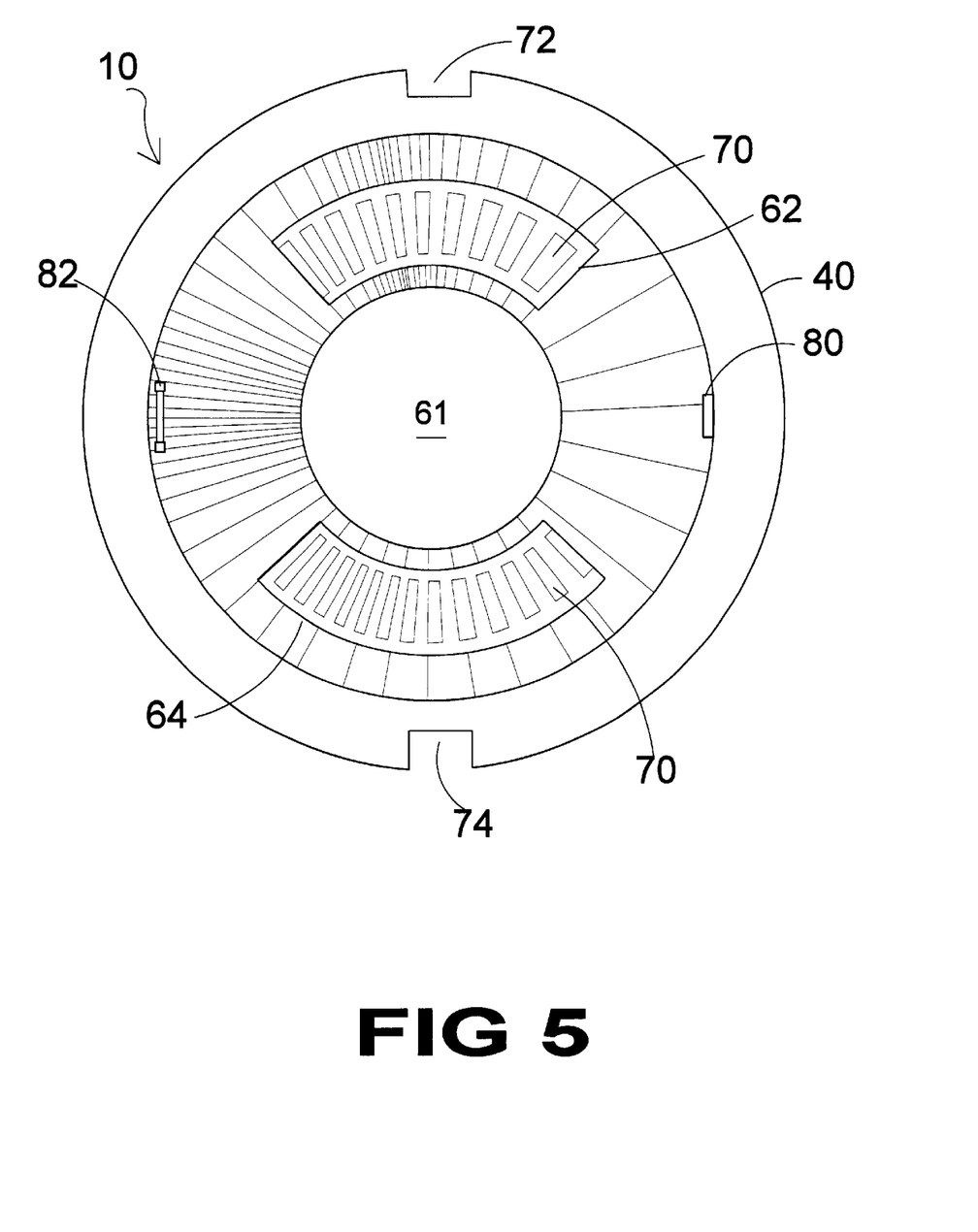
FIG. 5 is a top plan view of the cover for the inner container. Shown are the apertures providing access to the compartments formed by the basket-like structures. Also shown is a centrally disposed aperture providing means for access to the interior of the inner container.
Figure 6:
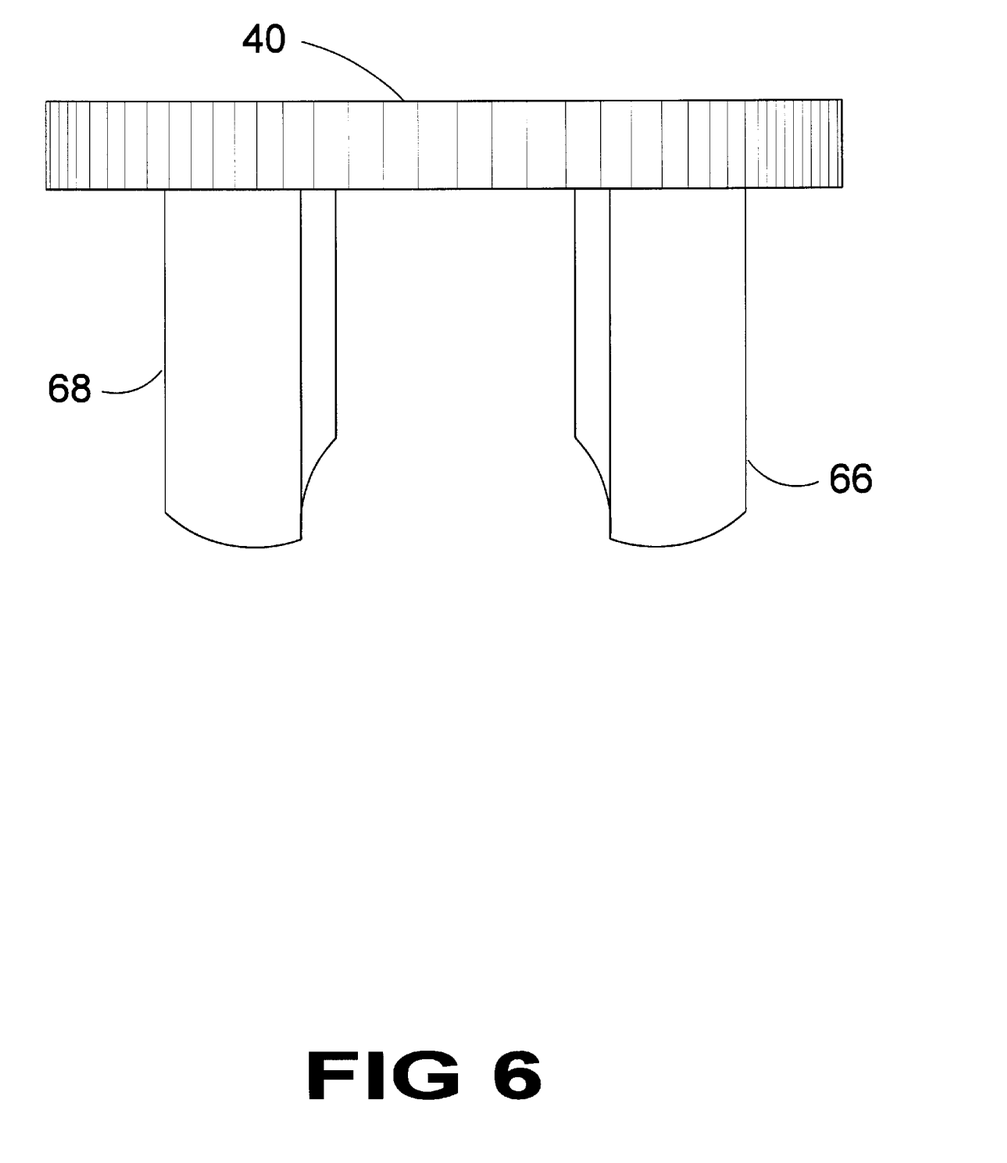
FIG. 6 is a side view of the cover for the inner container having two oppositely opposed and spaced apart basket-like containers which are used to segregate the contents of said container from each other and the rest of the inner enclosure. Further having a slotted base structure through which the fluid of the inner container freely travels.
Figure 7:
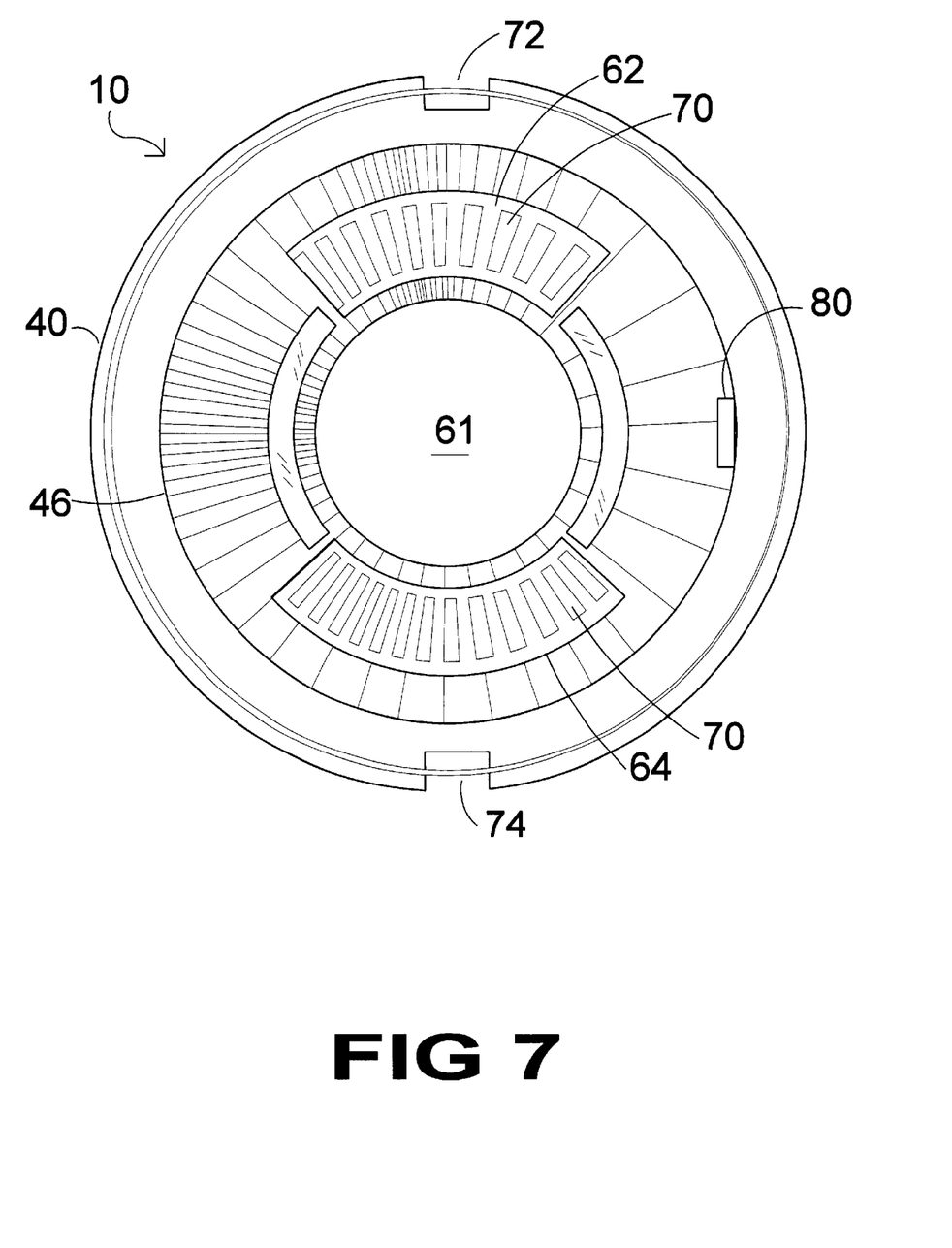
FIG. 7 is a bottom plan view of the inner container. Shown are the apertures providing access to the compartments formed by the basket-like structures. Also shown is a centrally disposed aperture providing means for access to the interior of the inner container.
Figure 8:
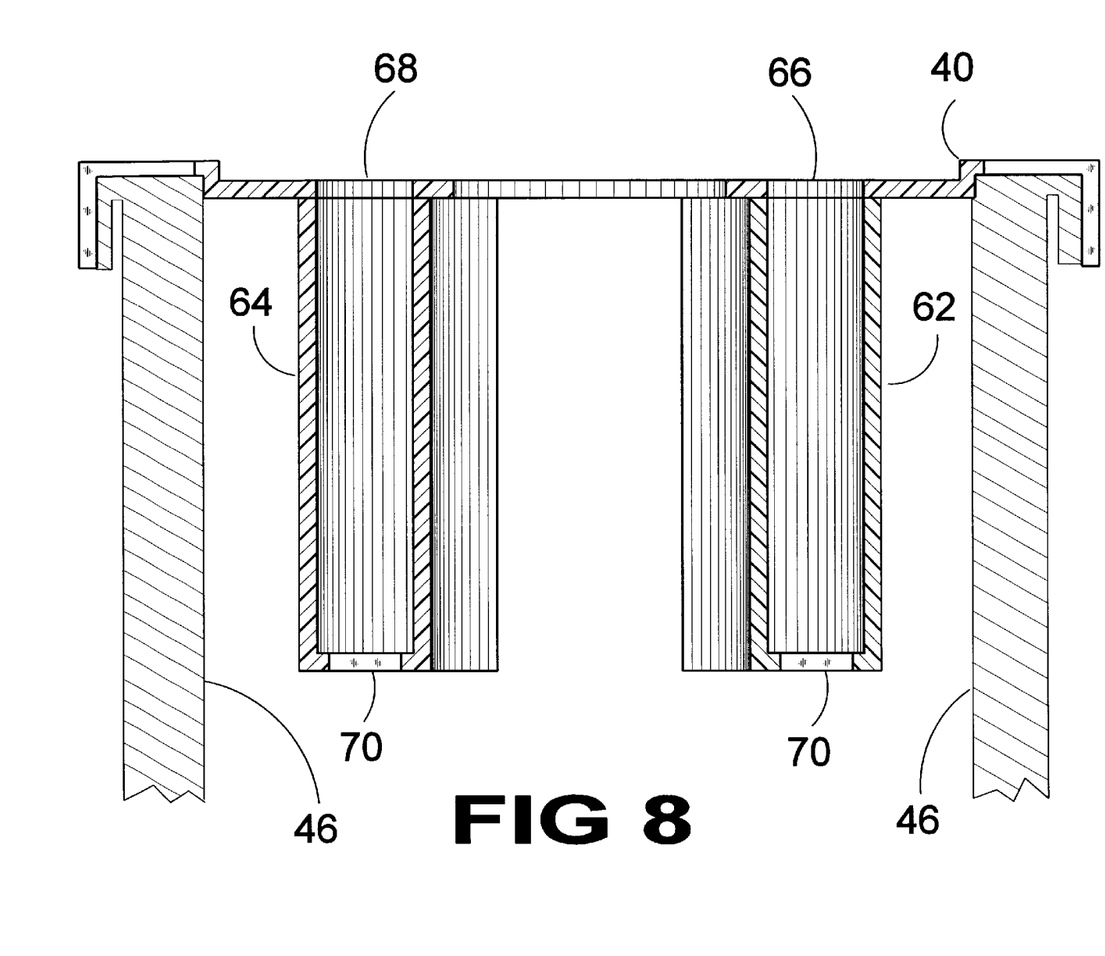
FIG. 8 is a cross sectional view of the cover for the inner container, taken from FIG. 4 as indicated, having two oppositely opposed and spaced apart basket-like containers which are used to segregate the contents of said container from each other and the rest of the inner enclosure. Further having a wall structure through which the fluid of the inner container freely travels.
Figure 9:
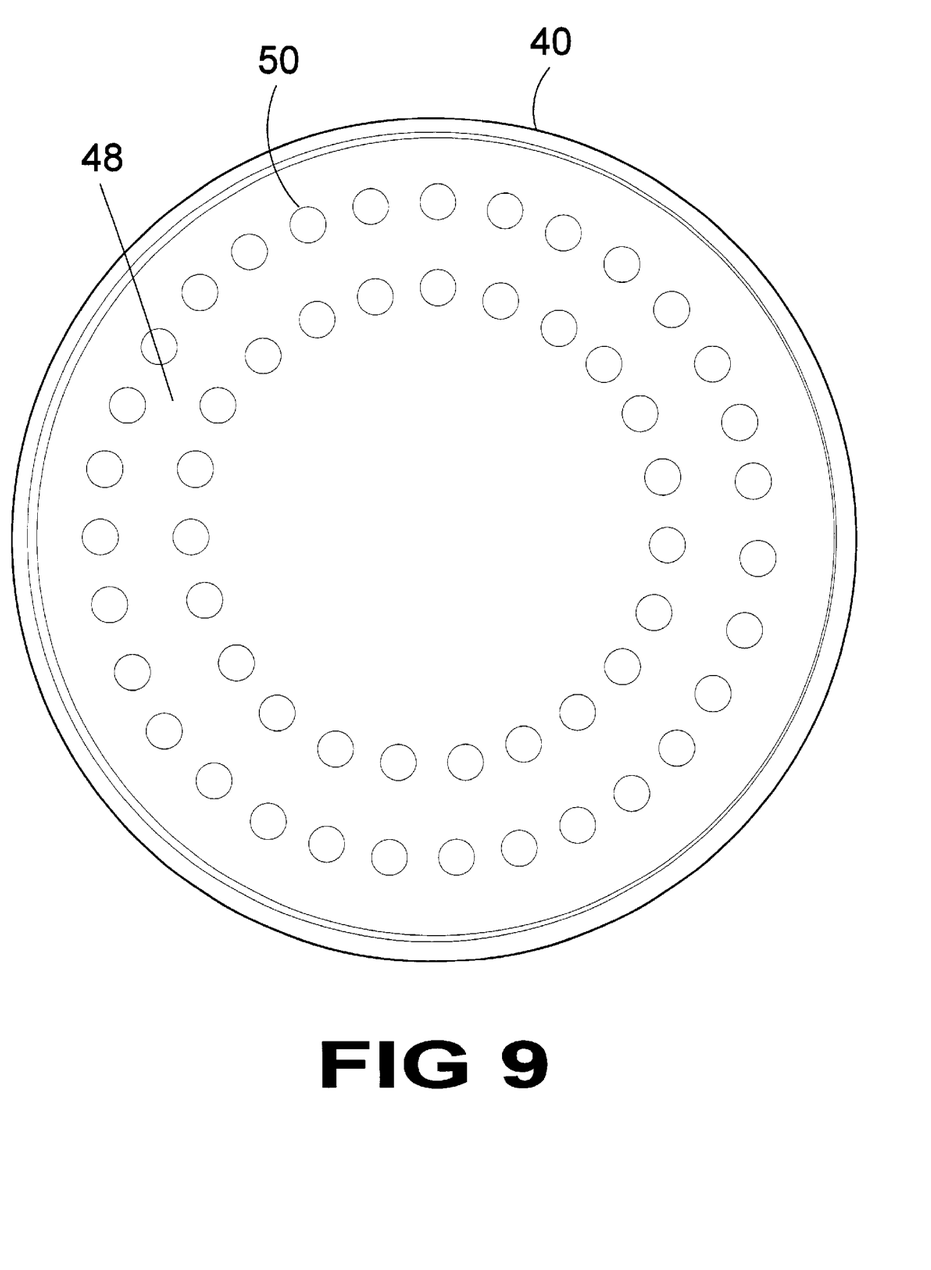
FIG. 9 is a bottom view of the inner container of the device, in an embodiment in which the inner container is closed at the bottom, allowing fluid passage only through the small holes.

A top portion 60 is fixed to the top of the inner container 40, as particularly shown in FIG. 8. In this embodiment, the top portion 60 has a circular aperture 61 that is centered on the top portion 60, and is sized to allow hand passage for grasping the contents 12 within the inner container 40. The contents 12 are isolated from contents 14,16 by the inclusion of circumferentially positioned compartments 62,64, the compartments 62,64 being accessed by apertures 66,68, respectively. Each compartment 62,64 has fluid passage holes 70, as depicted in FIGS. 5,7–8, for allowing fluid, but not bait, to pass from the compartments 62,64 into the inner container 40.

The top portion 60 also has cutaways 72,74, which direct attachment of the hinged handle 42 to the hinged handle pivot points 76,78 on the inner container wall portion 46. Also on the top portion 60 are a slot 80 and a pivot attachment 82 for hingedly receiving and securing a cover 90. The cover 90 has a hook 92 and a tongue 94 for this purpose, which allow the cover 90 to hingedly and detachably attached to the top portion 60. The top portion 60 is recessed such that the attached cover 90 is substantially flush with top of the top portion 60.

Figure 10:
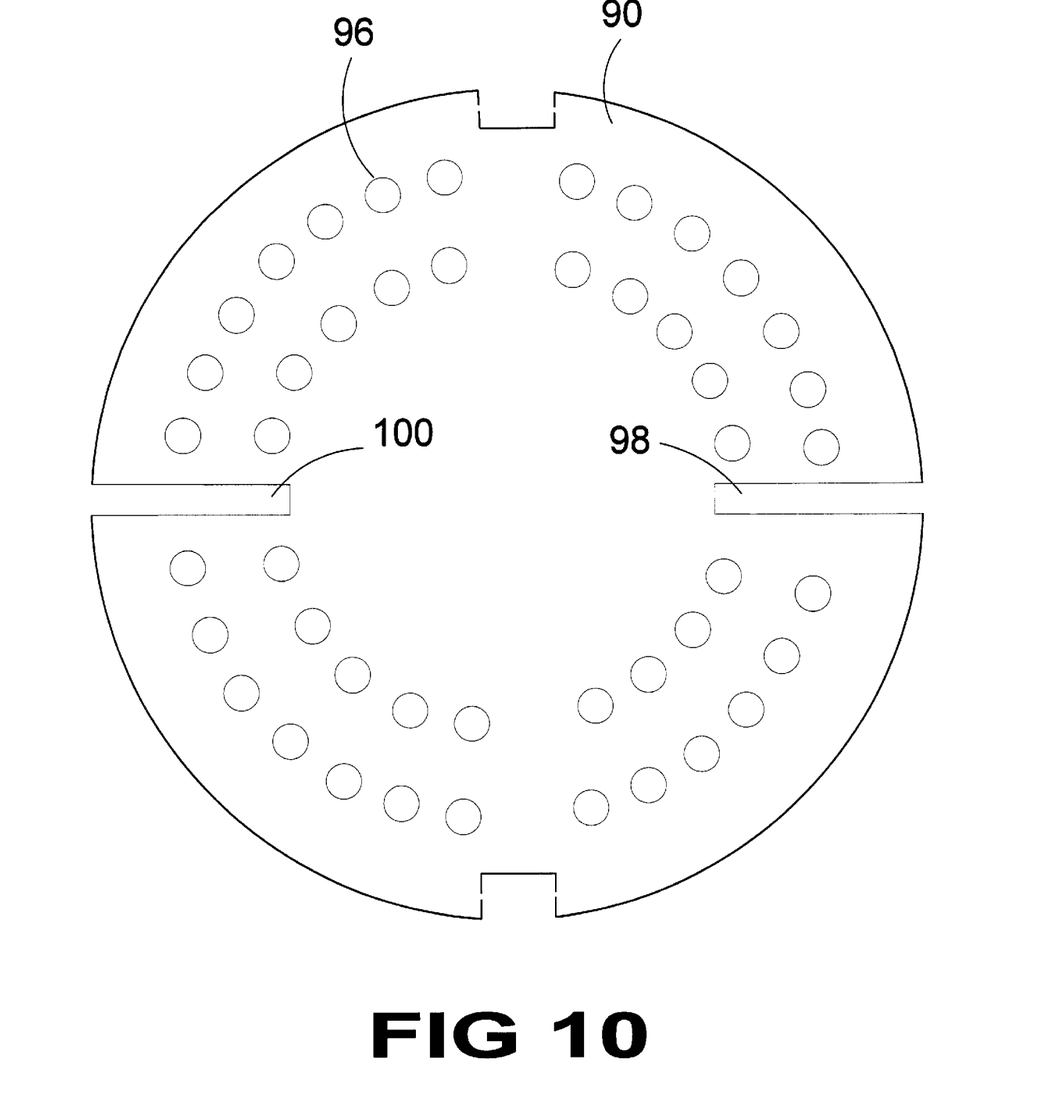
FIG. 10 is top view of an alternate embodiment of the cover having slots added such that leaders and fishing line can pass through the closed cover without being crimped.

The cover 90 also has holes 96, and in an embodiment depicted in FIG. 10, the cover has slots 98,100. Each slot 98,100 extends radially toward the center of the cover 90, to a point above the nearest aperture 66,68 respectively. This allows bait to be placed in a compartment 62,64 while still on a hook attached to a leader. The cover 90 can be closed with the leader in the slot 98,100, which will avoid crimping the leader, or any other plastically deformable line 102. A similar result would be obtainable with similarly placed semicircular notches.

In other embodiments the handle can be replaced by finger notches, fixed handles, grips, or similar handles, all of which can be configured to attach to the inner container wall portion 46, the top portion 60, or the cover 90, in accordance with the present invention, and as determined by the intended end use for the overall assembly, as will occur to those of skill in the art upon review of the present disclosure.

Similarly, other embodiments can exclude the outer container 30, and utilize the bucket portion of a typical double container bait bucket.

Other embodiments can also include an inner container 40 that is buoyant, and a top portion 60 with repositioned or reshaped apertures 61,62,64 in varying numbers and combination, in accordance with the present invention, and as determined by the intended end use for the overall assembly, as will occur to those of skill in the art upon review of the present disclosure It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for storing live bait, comprising:
   (a). a container, the container having a wall portion, a top portion attached to the wall portion, and an interior formed by the top portion and the wall portion, the container top portion having a compartment, the compartment having a plurality of fluid passage holes, the top portion further having a plurality of apertures, the plurality of apertures comprising:
  (1) a compartment aperture, the compartment aperture providing access to the top portion compartment through the top portion;
  (2) a container aperture, the container aperture providing access to the container interior surrounding the compartment; and
(b) a cover, the cover being detachably attached to the container top portion, the cover being sized to close the plurality of apertures.

2. The apparatus of claim 1, further comprising an outer receptacle, the outer receptacle having a wall portion, a bottom portion, and an enclosure formed by the wall and bottom portions, the enclosure being water tight, the enclosure being adapted to receive the container.

3. The apparatus of claim 1, wherein the container interior is circular.

4. The apparatus of claim 1, wherein the wall portion further comprises a plurality of fluid passage holes.

5. The apparatus of claim 1, wherein the container further comprises a bottom portion attached to the wall portion.

6. The apparatus of claim 1, wherein the number of compartments is at least two and the number of top portion compartment apertures is at least two.

7. The apparatus of claim 1, wherein the container aperture is generally centered on the top portion.

8. The apparatus of claim 1, wherein the container aperture is generally centered on the top portion, and at least two compartment apertures are circumferentially positioned about the container aperture.

9. The apparatus of claim 1, wherein the container aperture is sized for hand passage.

10. The apparatus of claim 1, wherein the cover is also hingedly attached.

11. The apparatus of claim 1, wherein the cover further comprises at least one notch.

12. The apparatus of claim 1, wherein the cover further comprises at least one slot.

13. The apparatus of claim 1, wherein the top portion further comprises a recess, the recess being sized and shaped to closely receive the cover.

14. The apparatus of claim 1, wherein the container is buoyant.

15. The apparatus of claim 1, further comprising a lift, for lifting the container by hand.

16. The apparatus of claim 15, wherein the lift is attached to the container wall portion.

17. The apparatus of claim 15, wherein the lift is a handle.

18. The apparatus of claim 17, wherein the handle is hingedly attached such that the handle is movable between an inclined and a reclined position.

19. The apparatus of claim 18, wherein the handle reclines to a position wherein the entire handle lies within the perimeter of the container top portion.

20. An apparatus for storing live bait, comprising:
(a) a container, the container having a wall portion, a top portion attached to the wall portion, and a circular interior formed by the top portion and the wall portion, the container top portion having at least two compartments, the compartments having a plurality of fluid passage holes, the top portion further having a plurality of apertures, the plurality of apertures comprising:
  (1) at least two compartment apertures, the compartment apertures providing access to the top portion compartments through the top portion;
  (2) a container aperture, the container aperture providing access to the container interior surrounding the compartments, the container aperture being generally centered on the top portion, such that the compartment apertures are circumferentially positioned about the container aperture;
(b) a cover, the cover being hingedly and detachably attached to the container top portion, the cover being sized to close the plurality of apertures;
(c) a container handle, for lifting the container by hand, the container handle being hingedly attached to the container wall portion; and
(d) an outer receptacle, the outer receptacle having a wall portion, a bottom portion, and an enclosure formed by the wall and bottom portions, the enclosure being water tight, the enclosure being adapted to receive the container.

* * * * *